Jan. 16, 1962
A. G. VAN ALSTYNE ET AL
3,017,105
SYSTEM FOR RADAR POSITIONAL DATA
Filed July 14, 1955
4 Sheets-Sheet 1
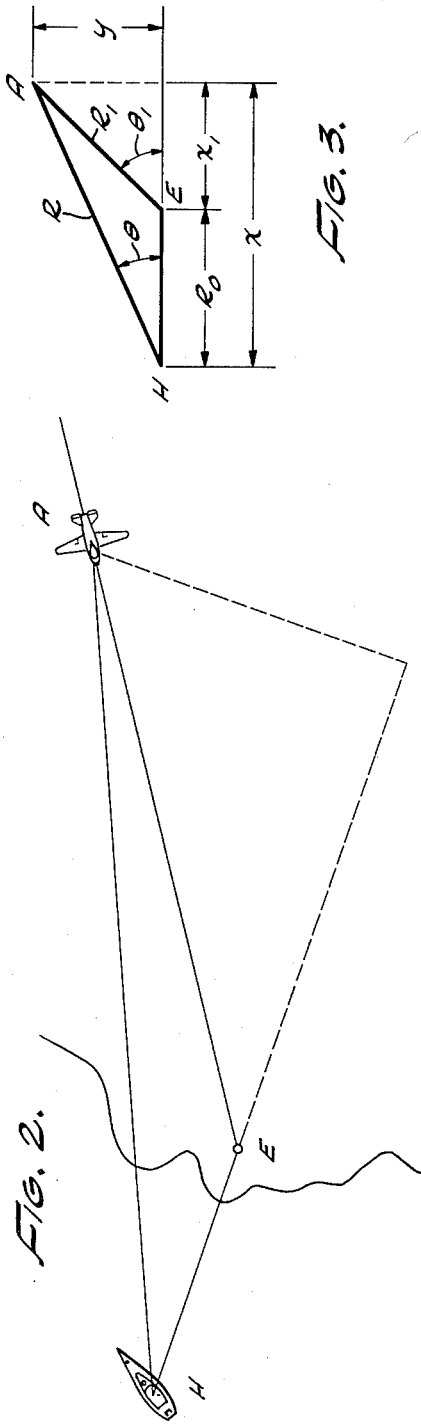
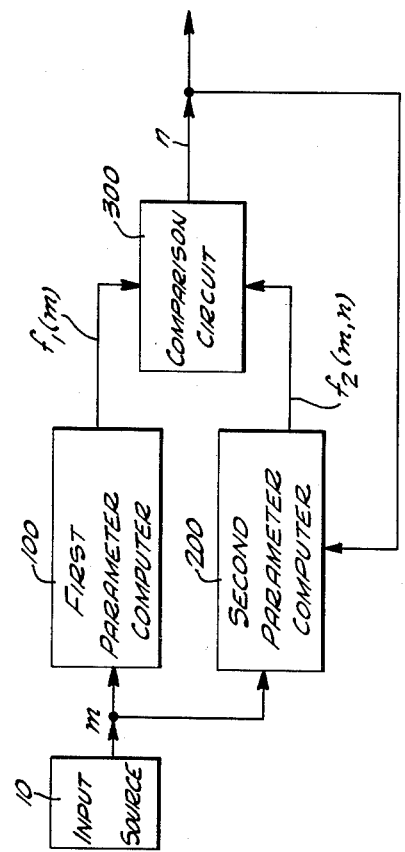
INVENTORS.
ALVIN GUY VAN ALSTYNE
GARVIN MILLER MOORE, JR.
BY
ATTORNEY

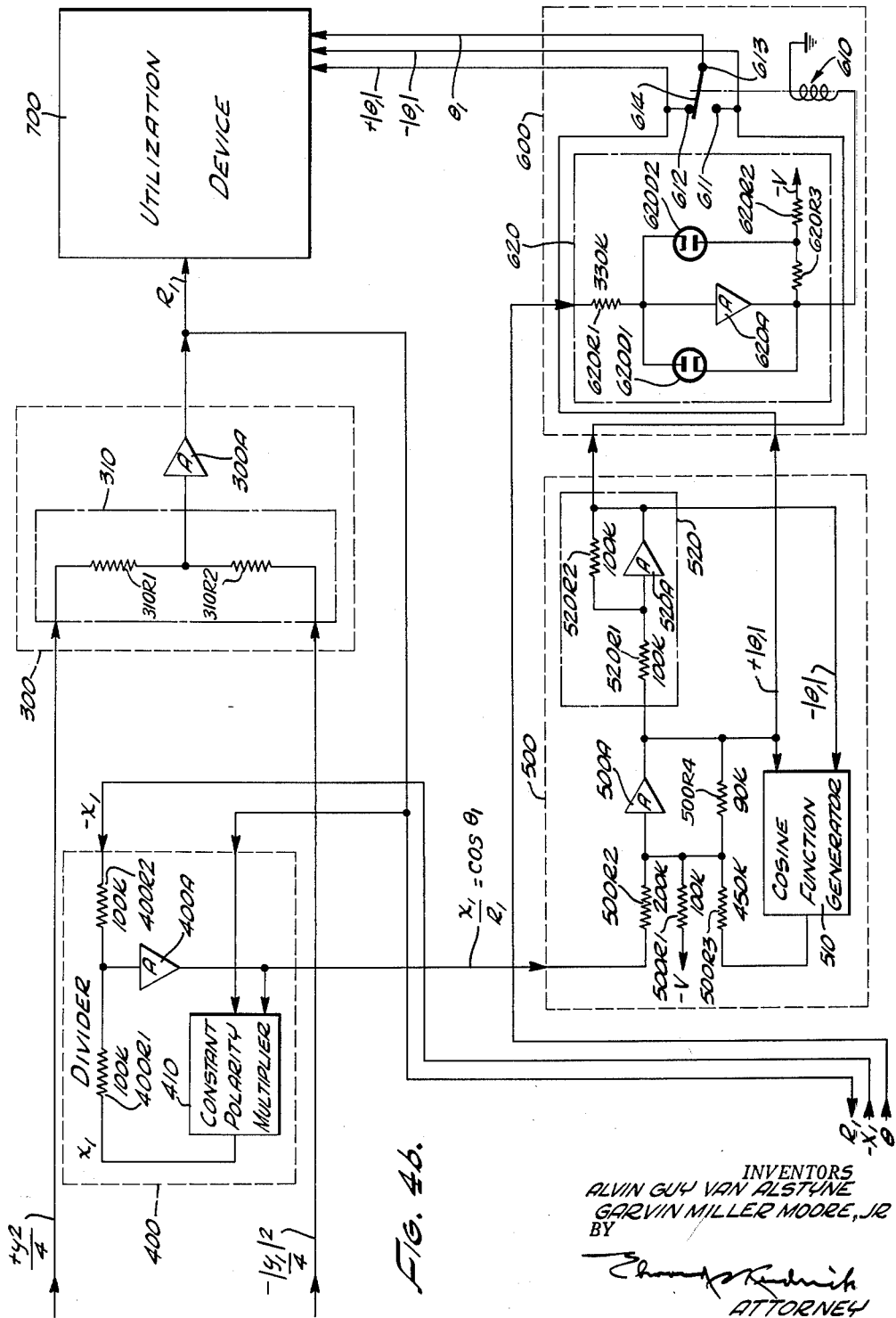

3,017,105
SYSTEM FOR RADAR POSITIONAL DATA
Alvin Guy Van Alstyne and Garvin M. Moore, Jr., Los Angeles, Calif., assignors to Gilfillan Bros. Inc., Los Angeles, Calif., a corporation of California
Filed July 14, 1955, Ser. No. 521,965
14 Claims. (Cl. 235—186)

This invention relates to coordinate translation devices and more particularly to a device for translating the coordinates of a point based upon a first set of reference axes into coordinates based upon a second set of reference axes.

While the system of the present invention may have many applications in various fields, it has been found to be particularly useful in the translation of radar positional data or polar coordinate data from other types of object locating devices. For examples, it is at present the practice to guide an aircraft to a point remote from a shipboard radar scanning station by obtaining the range and bearing of the aircraft with respect to the ship from the ship's radar. At the ship the range and bearing of the aircraft are translated into the polar coordinates of the aircraft with respect to the remote point or entry gate which is the origin of translation of the coordinates, the ship being the initial origin. The translated coordinates are then transmitted to the aircraft to guide it to the entry gate.

It is generally necessary to employ a coordinate translation device which will compute the translated coordinates of the aircraft at a rather high speed and with considerable accuracy because in certain radar positional data systems, data is made available to, or sampled for the coordinate translation device periodically for a length of time that is small compared to the data sampling period.

Servo mechanisms have been employed in the past to produce a translation of the polar coordinates of an aircraft with respect to a ship into the aircraf's coordinates with respect to an entry gate. However these servo mechanisms generally incorporate electro-mechanical elements which lack the required speed of response.

Alternatively, phase-amplitude analog coordinate translation systems have been employed in the past because of their instantaneous responses. In this type of system the amplitude of an alternating signal is employed to represent the magnitude of a polar distance and the phase of the signal is employed to represent a corresponding polar angle. Various operations are then performed on the phase and amplitude of the voltage to produce an output voltage having a phase and amplitude proportional to translated polar angle and distance coordinates, respectively.

In these phase-amplitude analog coordinate translation systems it is generally required that a nearly perfect sine wave be employed throughout, i.e., a signal without harmonic distortion. However, most computing elements are inherently nonlinear and some harmonics are generated. These harmonics then restrict the accuracy of the system, so that they have not performed satisfactorily for accurate aircraft guidance.

The present invention overcomes the above and other limitations of previously-known coordinate translation systems by providing a system wherein high-speed computation may be effected through directly-coupled computing components.

This high-speed computation is made possible through a novel means of coordinate translation where first and second reference signals are produced that are proportional to a common parameter; the first reference signal being based upon the initial coordinates of the target, and the second reference signal being based upon the translated coordinates.

These first and second reference signals then are compared to produce an output error signal which also constitutes one of the unknown parameters in the translated coordinate system. The error signal then is fed back to the means providing the second reference signal and results in a system stabilization in a state where the parameter computed on the basis of the translated coordinates is equal to the parameter computed on the basis of the initial coordinates.

This general technique of separate parameter computation, comparison for error-signal generation, and feedback for correction is compatible with all electronic direct-current analog translation instrumentation so that the entire computing and feedback arrangement may operate substantially instantaneously thereby obviating the disadvantages of the inertial effects of electro-mechanical servo mechanisms.

Furthermore, the approach of the invention allows a degree of accuracy which is limited only by the particular analog components employed, the feedback arrangement insuring that the system itself does not introduce significant further errors.

In a specific aspect of the invention, the sum and difference of the initial polar and Cartesian coordinates of a point with respect to a given initial origin are computed and the product taken of that sum and difference. Similarly the product of the sum and difference of the translated polar and Cartesian coordinates of the point with respect to an origin of translation are taken. In order to facilitate the computations of the products in each of these cases, the mean difference of a polar distance and Cartesian coordinate is first taken and then added to a signal proportional to the Cartesian coordinate. The addition of the Cartesian coordinate to the mean difference thus produces a mean sum which may be, in turn, multiplied by the mean difference to provide an output signal proportional to one-fourth the difference of the squares of the polar distance coordinate and the Cartesian coordinate. In this aspect of the invention the use of an additional inverter or adder is obviated.

It is, therefore, an object of the invention to provide improved coordinate translation system requiring a minimum of component parts.

It is another object of the invention to provide a highly accurate translation system.

It is still another object of the invention to provide a coordinate translation analog system having a high speed of response.

These and other objects and advantages of the present invention will be better understood when considered with the following description taken in connection with the accompanying drawings made a part of this specification, wherein several embodiments are illustrated by way of example. The device for the present invention is by no means limited to the specific embodiments illustrated in the drawings since they are shown merely for purposes of description.

FIG. 1 is a block diagram of an embodiment of the coordinate translation system of the present invention;

FIG. 2 is a plan position view of a ship and aircraft and an entry gate;

FIG. 3 is a plan view of a coordinate system including the origin of a ship and the origin of translation of an entry gate and an aircraft position;

FIGS. 4a and 4b are partial schematic diagrams of a more specific embodiment of the present invention as shown in FIG. 1.

Figure 4A:
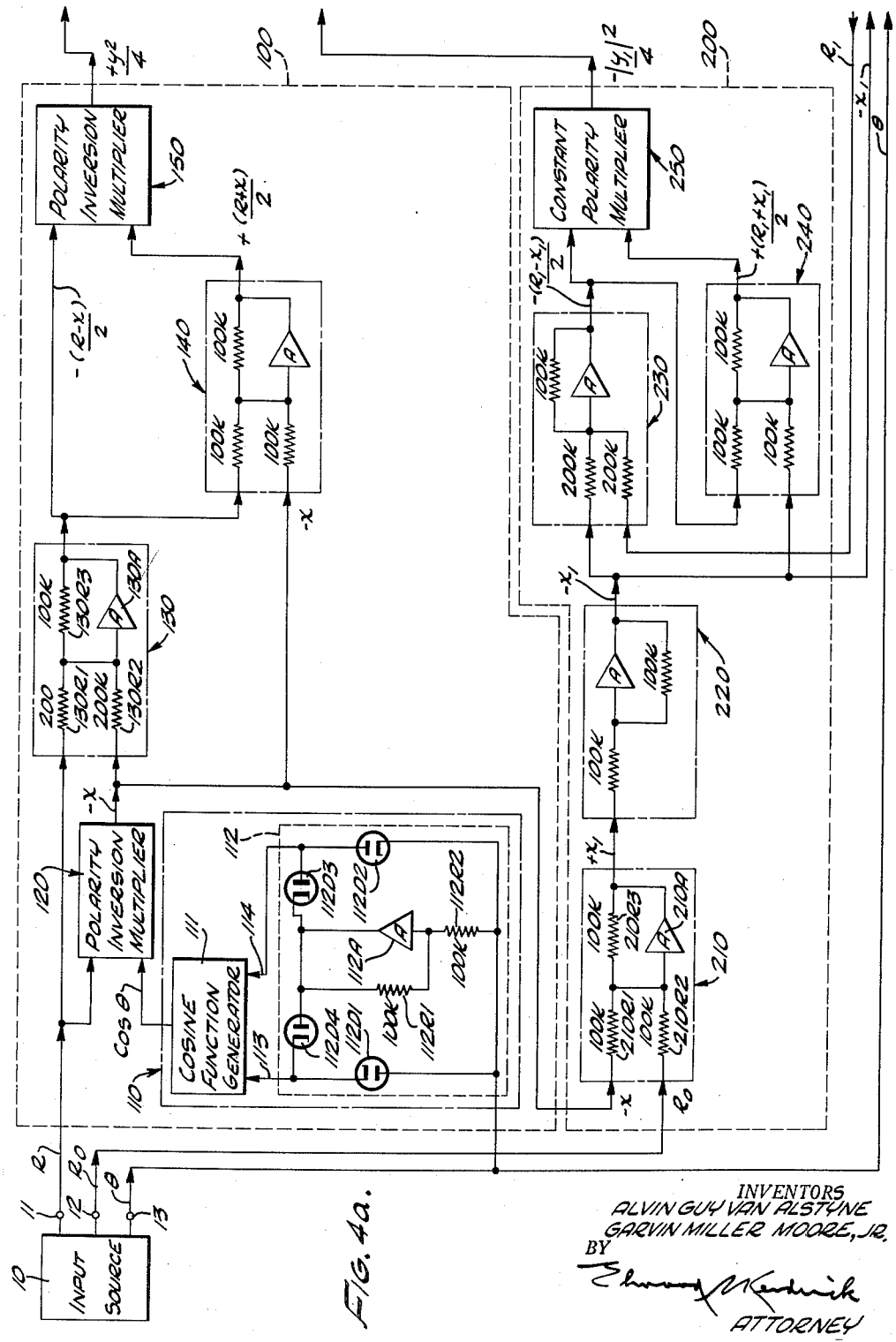

A computer is shown in FIG. 1 comprising an input source 10, a first parameter computer 100 responsive to the output signals of the signal source 10 for producing a function $f_1(m)$. A second parameter computer 200 responsive to the input signal $m$ is then employed to produce a function $f_2(m,n)$ which is compared in a comparison device 300 with $f_1(m)$ to give an output signal $n$, to which the second parameter computer 200 is made responsive. From a composite output signal $m$ of input source 10, the circuit of FIG. 1 then provides a composite output signal $n$ which is produced by a comparison of the function $f_1(m)$ and the function $f_2(m,n)$.

The utility of the computer of FIG. 1 may be better understood by reference to a specific application to that circuit. This is illustrated in the drawing in FIG. 2 where an aircraft position is denoted by A, an origin of a radar detection station is indicated by H, and an origin of translation is indicated by E. The same three designations are employed in a graphical representation in FIG. 3. Polar coordinates which are known are, therefore, the distance HA as denoted by R and the polar angle coordinate $\theta$ or the angle EHA shown in FIG. 3. Polar coordinates to be computed are the length of the line EA or $R_1$ and the polar angle coordinate $\theta_1$ which is the supplement of the angle HEA. If $y$ is employed to indicate the distance between A and the line passing through H and E, and $x$ is employed to indicate the distance between H and the line through A perpendicular to the line passing through HE, then $$y = [(R+x)(R-x)]^{\frac{1}{2}}$$

or $$y^2 = (R_1+x_1)(R_1-x_1)$$

or $$y_1^2 = (R_1+x_1)(R_1-x_1)$$

where $y_1$ is $y$ computed in a different way.

Use of the above relationships is not necessarily employed with the computer of the present invention; however, coordinate translation may be efficiently accomplished when the computation is made according to the above-described procedure, and therefore it is preferred.

A specific embodiment of the computer of the present invention is shown partially in block diagram form and partially in schematic in FIGS. 4a and 4b where input source 10 is shown with computers 100 and 200 and comparison circuit 300. Additionally shown in FIG. 4a are three output terminals 11, 12, 13 of input source 10 at which terminals direct-current voltages are produced that are proportional to aircraft range, R, the distance between the initial origin and the entry gate of the aircraft, $R_0$, and the bearing of the aircraft, $\theta$, respectively. Also shown are a divider 400, an arccosine function generator 500, angle polarity control means 600, and a utilization device 700. Input source 10 is connected to a first parameter computer 100 and a second parameter computer 200.

First parameter computer 100 computes function $f_1(m)$ which may be proportional to a parameter common to the given set of polar coordinates R,$\theta$ and the polar coordinates of translation $R_1\theta_1$ to be computed. For example, $f_1(m)$ may be proportional to the actual distance $y$ shown in FIG. 3 or the actual distance $x_1$. Second parameter computer 200 then computes a second function $f_2(m,n)$ which corresponds to the same parameter. The exact value of the parameter is indicated by $f_1(m)$ whereas an approximate value is indicated by $f_2(m,n)$ which is based upon the magnitude of a computed value of one of the polar coordinates which may also be $R_1$ or $\theta_1$.

Comparison circuit 300 is shown connected to both first parameter computer 100 and second parameter computer 200 for comparing the values of the functions $f_1(m)$ and $f_2(m,n)$ to produce a voltage proportional to $R_1$ or $\theta_1$ by means of a high gain amplifier the bias on which may be changed by the appearance of a difference voltage between voltages representing the parameters $m_1$ and $m_2$. In order that second parameter computer 200 may compute $f_2(m,n)$ on the basis of the computed value of $R_1$ or $\theta_1$, the output side of comparison circuit 300 is accordingly connected to second parameter computer 200 which operates to produce the function $f_2(m,n)$ in response to the output signals of comparison circuit 300 and input source 10.

The specific embodiment of the invention as shown in FIGS. 4a and 4b includes first parameter computer 100 having cosine function generator means 110 connected from terminal 13 of input source 10 to a polarity inversion multiplier 120, which also has a connection 11. Both cosine function generator means 110 and polarity inversion multiplier 120 may be included in either the first parameter computer 100 or the second parameter computer 200. A mean sum adder 130 is then connected from polarity inversion multiplier 120 and from terminal 11 of input source 10. An adder 140 is connected from polarity inversion multiplier 120 and mean sum adder 130 to produce an output signal proportional to $$+\left(\frac{R+x}{2}\right)$$

which is impressed with the output of mean sum adder 130 on a polarity inversion multiplier 150. An adder 210 in computer 200 is connected from terminal 12 and polarity inversion multiplier 120. Adder 210 then is connected to a polarity inverter 220 which is connected to a mean sum adder 230. An adder 240 is connected from the output of inverter 220 and from the output of mean sum adder 230 to a constant polarity multiplier 250 which also receives the output signal of mean sum adder 230. The outputs of polarity inversion multipliers 150 and 250 are then impressed upon a summing circuit 310 in comparison circuit 300. Comparison circuit 300 also includes an amplifier 300A connected from the output of summing circuit 310. The output of amplifier 300A is connected both to utilization device 700 and to mean sum adder 230.

The output of amplifier 300A is the computed polar distance coordinate $R_1$. The polar angle coordinate $\theta_1$ may be obtained by dividing $x_1$ by $R_1$ to obtain $\cos \theta_1$ whereby $\theta_1$ may be obtained. This is accomplished through divider 400 which is connected from polarity inverter 220 and the output of comparison circuit 300 to arccosine function generator 500. Angle polarity control means 600 is connected from arccosine function generator 500 to utilization device 700, whereby an output voltage may be provided which is the positive or negative absolute value of $\theta_1$ or equal to $\theta_1$. Summarily the operation of the translation computer shown in FIG. 4 is the computation of the product of $$\frac{(R-x)}{2}\frac{(R+x)}{2}$$

whereby the actual value of $$\frac{y^2}{4}$$

is obtained and added to $$-\frac{|y_1|^2}{4}$$

to give an output proportional to or equal to $R_1$ in accordance with well known implicit function techniques described in Electronic Instruments, Greenwood, Holdann and McRae, 1948 (McGraw-Hill) pages 15–23. The amplifier 300A is a high gain amplifier and an error produced in $R_1$, which is employed in calculating $y_1$ or $$\frac{y_1^2}{4}$$

is compensated by a change in the output of the high gain amplifier 300A. The mean sum and difference of $R,x$ and $R_1,x_1$ are computed in order to obviate the necessity of using an inverter amplifier.

The particular translation computer of the present invention shown in FIG. 4 operates as follows: cosine function generator means 110 produces the cosine function of $\theta$, the cosine function generator means 110 being connected to the terminal 13 of input source 10. Cos $\theta$ is then multiplied by R by polarity inversion multiplier 120 which is connected to terminal 11 and to cosine function generator means 110. The output voltage of polarity inversion multiplier 120 is thus proportional to $-x-R\cos\theta$ because of its polarity inversion characteristic which is well known in the art. Mean sum adder 130 adds R to $-x$ since it is connected to terminal 11 and to the output side of polarity inversion multiplier 120 and takes the mean sum in a well known manner as will be later described. The output of means sum adder 130 is then $$-\left(\frac{R-x}{2}\right)$$

Adder 140 adds $-x$ to the output of mean sum adder 130 which is $$-\left(\frac{R-x}{2}\right)$$

to arrive at an output voltage proportional to $$+\frac{R+x}{2}$$

adder 140 also being a polarity inversion adder as is the common case. The polarity inversion multiplier 150 connected to mean sum adder 130 and adder 140 multiplies the outputs of mean sum adder 130 and adder 140 to arrive at $$+\left(\frac{R-x}{2}\right)\left(\frac{R+x}{2}\right)=+\frac{y^2}{4}$$

which is the output of polarity inversion multiplier 150. Comparison circuit 300 compares the output of constant polarity multiplier 250, which is $$-\frac{|y_1|^2}{4}$$

and the output of polarity inversion multiplier 150, which is $$+\frac{y^2}{4}$$

to arrive at a computed value of $R_1$ at the output side of amplifier 300A which is fed back to means sum adder 230.

Adder 210, connected from terminal 12 and from polarity inversion multiplier 120, computes $-x+R_0$ and inverts the polarity of the sum as indicated at the output of the adder 210 as $+x_1$. The output of adder 210 is then itself inverted to obtain $-x_1$. $-x_1$ is added to $R_1$ by means sum adder 230 which takes the mean sum of $R_1-x_1$ to obtain $$-\left(\frac{R_1-x_1}{2}\right)$$

Adder 240 connected from polarity inverter 220 and mean sum adder 230 then adds $$-x_1 \text{ to } -\left(\frac{R_1-x_1}{2}\right)$$

to obtain $$+\left(\frac{R_1+x_1}{2}\right)$$

with polarity inversion. Constant polarity multiplier 250 when biased properly, as well known in the art, may produce $$-\frac{|y_1|^2}{4}=\left|\left(\frac{R_1+x_1}{2}\right)\left(\frac{R_1-x_1}{2}\right)\right|$$

The sum of $$+\frac{y^2}{4} \text{ and } -\frac{|y_1|^2}{4}$$

is then taken by summing circuit 310 which is connected to high gain amplifier 300A to produce the polar distance coordinate $R_1$ when only a trivial difference exists between the outputs of polarity inversion multiplier 150 and constant polarity multiplier 250.

A voltage proportional to $\theta_1$ is obtained in a well known manner. $-x_1$ is fed to divider 400 from the output of polarity inverter 220 and $R_1$ is fed to divider 50 from comparison circuit 300. Divider 400 thus divides $x_1$ by $R_1$ giving $$+\frac{x_1}{R_1}=\cos\theta_1$$

a polarity inversion being conventional. $+\theta_1$ is obtained by arccosine function generator 500 in a well known manner and angle polarity control means 600 provides an output signal proportional to $\theta_1$ and also the negative and positive of the absolute value of $\theta_1$ by means which will be explained hereinafter.

In FIG. 4 cosine function generator means 110, which is only capable of operating with positive values of $\theta$, is shown in more detail comprising a cosine function generator 111 and a constant polarity circuit 112. Constant polarity circuit 112 comprises a well known combination including four diode rectifiers 112D1, 112D2, 112D3 and 112D4 and an amplifier 112A which is provided with a feedback resistor 112R1 and a series resistor 112R2 which is connected to the $\theta$-terminal 13 of input source 10. Series resistor 112R2 is connected directly from $\theta$-terminal 13 to amplifier 112A across which feedback resistor 112R1 is connected. Rectifier 112D1 is connected from terminal 13 to cosine function generator 111 to isolate terminal 13 from a lead 113 of the function generator 111 when $\theta$ is negative, the anode of rectifier 112D1 being connected to terminal 13 and the cathode of rectifier 112D1 being connected to lead 113. Rectifier 112D4 is connected from amplifier 112A to cosine function generator 111 to isolate the amplifier 112A from lead 113 when $\theta$ is positive, the anode of rectifier 112D4 being connected to amplifier 112A and the cathode of rectifier 112D4 being connected to lead 113.

As is conventional with cosine function generators, it is necessary to provide a voltage proportional to both the positive and negative values of the absolute value of an angle. Accordingly $-|\theta|$ is provided by the rectifiers 112D2 and 112D3 which have their anodes connected to a lead 114 of cosine function generator 111. Rectifier 112D2, having its cathode connected to terminal 13, isolates terminal 13 from lead 114 when $\theta$ is positive. Rectifier 112D3, having its cathode connected to amplifier 112A, isolates amplifier 112A from lead 114 when $\theta$ is negative.

All of the adders 210, 140 and 240 comprise simply an amplifier with an appropriate summing circuit and feedback resistor as shown, for example, with respect to the adder 210 which comprises summing resistors 210R1 and 210R2, amplifier 210A and feedback resistor 210R3.

The mean sum adders 130 and 230 are identical. Mean sum adder 130, for example, comprises two summing resistors 130R1 and 130R2, an amplifier 130A and a feedback resistor 130R3 having a resistance equal to one-half that of summing resistors 130R1 and 130R2. Summing circuit 310 simply comprises two summing resistors 310R1 and 310R2.

Divider 400 comprises a well known circuit including a constant polarity multiplier 410, summing resistors 400R1 and 400R2 and an amplifier 400A. Arccosine function generator 500 likewise comprises a well known combination of conventional elements including a voltage biasing resistor 500R1, summing resistors 500R2 and 500R3, a cosine function generator 510, an amplifier 500A, an amplifier feedback resistor 500R4, and a polarity inverter 520 including a series resistor 520R1, an amplifier 520A and a feedback resistor 520R2, polarity inverter 520 being identical to polarity inverter 220. The output of amplifier 500A thus provides cosine function generator 510 with the value $+|\theta_1|$ and the output of amplifier 520A provides cosine function generator 510 with the value $-|\theta_1|$.

Angle polarity control means 600 comprises a relay 610 having a first terminal 611 and a second terminal 612 which are connected from the arccosine function generator 500. An output terminal 613 is provided for relay 610 from which an output of $+|\theta_1|$ may be taken. $-\theta_1$ may be taken from the first terminal 611 whereas $+|\theta_1|$ may be taken from second terminal 612. A contact arm 614 is pivoted at output terminal 613 and normally connects second terminal 612 to output terminal 613.

When the polarity of $\theta$ at terminal 13 of input source 10 is negative, it is necessary to energize relay 610 to cause the contact arm 614 to pivot downward to connect second terminal 611 to output terminal 613 whereby $+\theta_1$ may still be produced. To this end a polarity reversal control circuit 620 is provided comprising a series resistor 620R1, an amplifier 620A having two rectifiers 620D1 and 620D2 connected in parallel thereacross, and two resistors 620R2 and 620R3. Rectifier 620D1 is connected directly in parallel with amplifier 620A to maintain the output of amplifier 620A at a relatively low positive or negative potential when $\theta$, at terminal 13 is positive. Relay 610 will not then be energized. Accordingly the anode of rectifier 620D1 is connected to the input side of amplifier 620A. The cathode of rectifier 620D2 is connected from the input side of amplifier 620A and resistor 620R3 is connected from the anode of rectifier 620D2 to the output side of amplifier 620A. The rectifier 620D2 is biased negatively through resistor 620R2 which is connected from the anode of rectifier 620D2 to a negative source of potential. When $\theta$ at terminal 13 becomes negative, amplifier 620A produces a relatively high positive output voltage which energizes relay 610. The amplifier 620A thus should have a relatively high gain. When such is the case, relay 610 may be overloaded. For this reason a feedback path through rectifier 620D2 is provided for the amplifier 620A. The feedback path thus becomes operative when the positive output voltage of amplifier 620A overcomes the negative bias on rectifier 620D2.

All the amplifiers shown in FIG. 4 are well-known in the art and may be chopper-stabilized direct-current amplifiers such as those described on pages 200–210 of Electronic Analog Computers, Korn and Korn, 1952 (McGraw-Hill). The multipliers shown in FIG. 4 should be four-quadrant multipliers as described on page 212 of the above cited reference and the cosine function generators of FIG. 4 are preferably of the biased diode type described on pages 271–279 of the Korn and Korn book.

Summarizing, the translation computer of the present invention computes the quantity $$\frac{+y^2}{4}$$

computes the quantity $$\frac{-y_1^2}{4}$$

and compares those quantities using a difference voltage to produce $R_1$ from which $\theta_1$ may be computed. Of course, alternative methods of computation may be employed by altering this preferred method without departing from the scope of the present invention. For example, $y$ may be computed and $x_1$ may be computed as $R \cos \theta - R_0$, $x_{12}$, i.e. $x_1$ computed in a different way, may be computed as $y \cot \theta_1$ using a calculated value of $\theta_1$. The quantities ($R \cos \theta - R_0$) and ($y \cot \theta_1$) may then be compared to produce $\theta_1$. Such an embodiment of the present invention is shown in block diagram form in FIG. 5.

Figure 5:
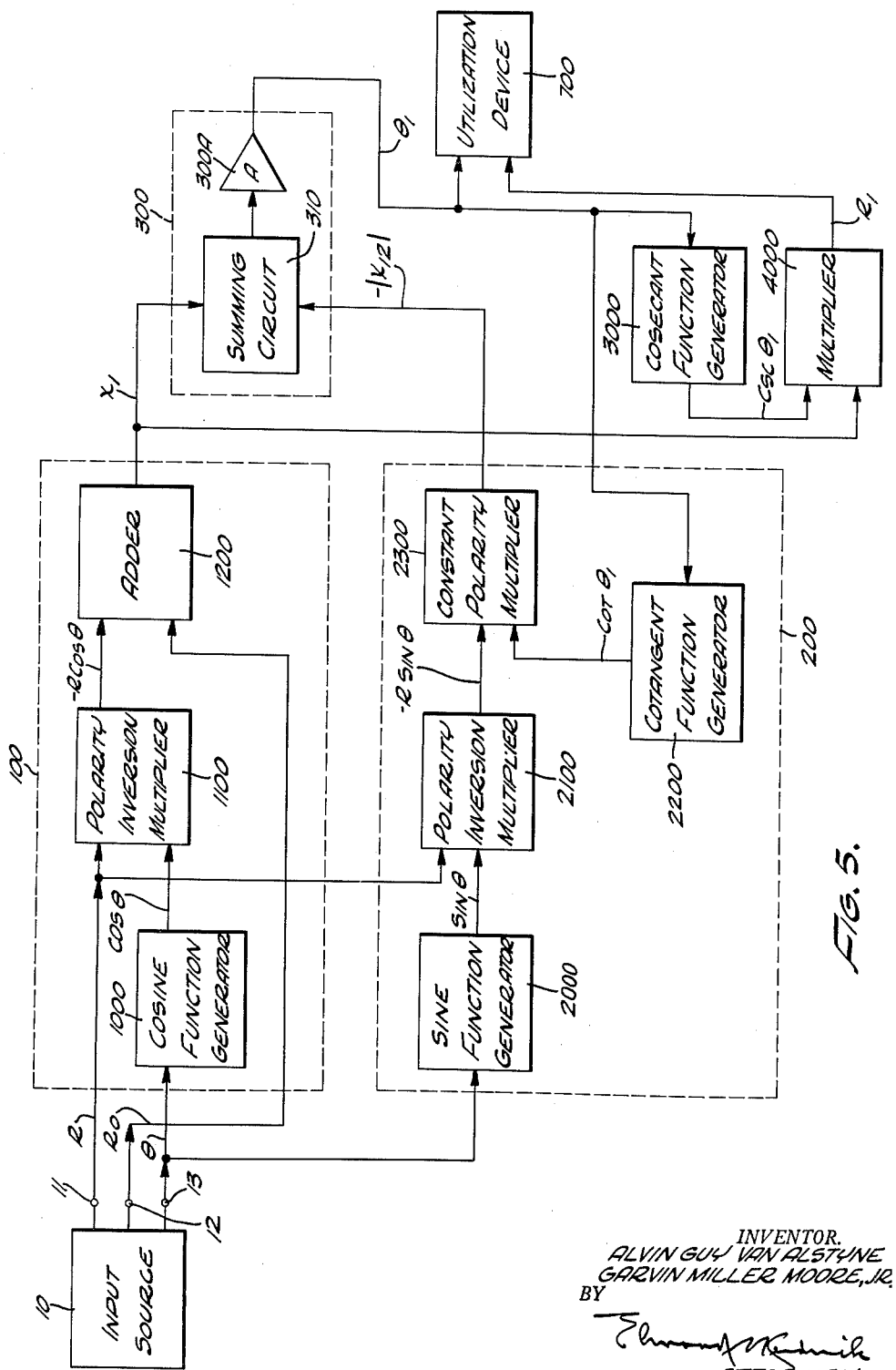
FIG. 5 is a block diagram of an alternative embodiment of the invention.

Input source 10 is shown in FIG. 5 with first parameter computer 100, second parameter computer 200, comparison circuit 300, and utilization device 700 connected in the same manner as they are shown connected in FIG. 1. First parameter computer 100 in FIG. 5 comprises a cosine function generator 1,000 which is connected to the $\theta$-terminal 13 of input source 10 to produce an output signal proportional to $\cos \theta$. First parameter computer 100 also includes a polarity inversion multiplier 1100 and an adder 1200. The polarity inversion multiplier 1100 is connected from the R-terminal 11 of input source 10 and from cosine function generator 1,000 to adder 1200 for computing the product $-R \cos \theta$ to which $R_0$ is added in adder 1200 to produce an output signal proportional to $x_1$. Comparison circuit 300 shown in FIG. 5 may be exactly the same as that shown in FIG. 4 with summing circuit 310 and amplifier 300A.

Second parameter computer 200 in FIG. 5 comprises a sine function generator 2,000, a polarity inversion multiplier 2100, a cotangent function generator 2200, and a constant polarity multipler 2300. Sine function generator 2,000 is connected from the $\theta$-terminal 13 of input source 10 to polarity inversion multiplier 2100 to supply polarity inversion multiplier 2100 with a signal proportional to the sine of $\theta$. Sin $\theta$ is then multiplied by R in polarity inversion multiplier 2100 to give an output signal proportional to $R \sin \theta$. Constant polarity multiplier 2300 is connected from polarity inversion multiplier 2100 and cotangent function generator 2200 to summing circuit 310 of comparison circuit 300. The output signal of comparison circuit 300, which is chosen to be $\theta_1$, is introduced to utilization device 700 and cotangent function generator 2200 of second parameter computer 200. The output signal of comparison circuit 300 is introduced to a cosecant function generator 3,000 which is, in turn, connected to a multiplier 4,000, multiplier 4,000 being connected to utilization device 700.

The general operation of the invention as shown in FIG. 5 is identical to that described in relation to the block diagram illustrated in FIG. 1. The embodiment of the invention shown in FIG. 5, however, differs from that shown in FIG. 4 in that the parameter compared in comparison circuit 300 in FIG. 5 is the parameter $x_1$, the computed value of which is indicated by $x_{12}$. A difference between $x_1$ and $-|x_{12}|$ is thus detected by comparison circuit 300 which then produces an output signal proportional to $\theta_1$ in response to the existence of such a difference. $x_{12}$ is computed in a straight-forward manner, i.e., $\cot \theta_1$ is produced by cotangent function generator 2200 and this is, in turn, multiplied by $-R \sin \theta$ by constant polarity multiplier 2300 to give $-|x_{12}|$.

$R_1$ is computed and fed to utilization device 700 in the following manner. The cosecant of $\theta_1$ is produced by cosecant function generator 3,000 in response to the input signal proportional to $\theta_1$. $x_1$ which is the accurate value of the distance indicated in FIG. 3 is then multiplied by csc $\theta_1$ by multiplier 4,000 to produce an output signal proportional to $R_1$.

In particular, the operation of the embodiment of the invention shown in FIG. 5 is as follows: cosine function generator 1,000 in first parameter computer 100 computes cos $\theta$. Polarity inversion multiplier 1100, responsive to signals proportional to R and cos $\theta$, then produces an output signal proportional to the product $-R \cos \theta$ which is added to $R_0$ in adder 1200 to give $x_1$ after an appropriate conventional polarity inversion is produced. It is obvious from FIG. 3 that the mathematical relationship between $x_1$, R, $R_0$ and $\theta$ is as follows: $x = R \cos \theta$, therefore, $x_1 = x - R_0 = R \cos \theta - R_0$.

Second parameter computer 200 computes $-x_{12}$ in the following manner: sine function generator 2,000 produces an output signal proportional to sin $\theta$. R is multiplied by sin $\theta$ in polarity inversion multiplier 2100 and gives an output signal proportional to $-R \sin \theta$. The output signal of comparison circuit 300 is selected to be proportional to $\theta_1$. On the basis of this computed value the function cot $\theta_1$ is then produced by cotangent function generator 2200. Cot $\theta_1$ is then multiplied by $-R \sin \theta$ in constant polarity multiplier 2300 to give an output signal proportional to $-x_{12}$.

It is evident from FIG. 3 that this is true because $y = R \sin \theta$; therefore, $x_{12} = y \cot \theta_1 = R \sin \theta \cot \theta_1$.

$R_1$ is fed to utilization device 700 by multiplier 4,000 which obviously computes the product $x_1$ csc $\theta_1$ which equals $R_1$. $x_1$ in this case is thus provided by the output signal of first parameter computer 100 and csc $\theta_1$ is provided by cosecant function generator 3,000 which is responsive to the output signal of comparison circuit 300, the output signal of comparison circuit 300 being proportional to the polar angle coordinate $\theta_1$.

What is claimed is:

1. A coordinate translation system for producing an output signal proportional to at least one polar coordinate of a point with respect to a given origin of translation in response to signals proportional to the polar coordinates of the point with respect to a given initial origin, said translation system comprising means responsive to the input signals for producing a first reference signal proportional to a variable common to each of the coordinate systems, means responsive to said input signals and said output signal for producing a second reference signal proportional to said common variable, and means responsive to said first and second reference signals for producing said output signal.

2. In combination in a coordinate translation system for producing output voltages proportional to the translated polar coordinates of a predetermined point with respect to a given origin of translation from a given set of polar coordinates of the point with respect to a given initial origin, the translation system incorporating an input source for supplying input voltages proportional to the given set of coordinates and the distance between the origins; means responsive to the input voltages for computing a first reference voltage proportional to the actual distance between the predetermined point and a line passing through both of the origins using the given set of polar coordinates, means responsive to the input voltages and one of the output voltages for computing a second reference voltage proportional to said distance using the computed values of the translated polar coordinates, and means for correcting any error in said computed values of the translated polar coordinates in response to the production of a difference of potential between said first and second reference voltages.

3. A coordinate translation system for producing output voltages proportional to the translated polar coordinates $R_1$, $\theta_1$ of a predetermined point in a plane of reference with respect to a given origin of translation disposed at a distance $R_0$ from a given initial origin, said polar coordinates of said predetermined point with respect to said initial origin being R and $\theta$, said translation system comprising first means for producing input voltages proportional to $R_0$, R and $\theta$, second means responsive to the input voltages for computing a first reference voltage proportional to the actual distance between the predetermined point and a line passing through both of the origins using the given set of polar coordinates, third means responsive to the input voltages and one of the output voltages for computing a second reference voltage proportional to said distance, and fourth means for correcting any error in said computed values of the translated polar coordinates in response to the production of a difference of potential between said first and second reference voltages.

4. The invention as defined in claim 3, wherein one of said first and second means includes means for computing the product $R \cos \theta = x$, said first means including means for computing the product $$\left(\frac{R-x}{2}\right)\left(\frac{R+x}{2}\right) = \frac{y^2}{4}$$

said second means including means for computing the product $$-\left|\left(\frac{R_1-x_1}{2}\right)\left(\frac{R_1+x_1}{2}\right)\right| = \frac{|y_1|^2}{4}$$

and said third means including means for deriving a voltage proportional to the difference $$\frac{+y^2}{4} - \frac{|y_1|^2}{4}$$

to correct one of the computed polar coordinates $R_1$ and $\theta_1$ in response to a production of a difference between $$\frac{+y_1^2}{4} - \frac{|y_1|^2}{4}$$

5. The invention as defined in claim 3, wherein an input source is provided for producing input voltages proportional to R, $R_0$ and $\theta$ at R—, $R_0$— and $\theta$— terminals, respectively; one of said first and second means includes cosine function generator means connected from said $\theta$— terminal to produce an output voltage proportional to the function cos $|\theta|$; one of said first and second means includes a first polarity inversion multiplier connected from said R— terminal and said cosine function generator to produce an output voltage proportional to the product $-R \cos \theta = -x$; said first means includes a first mean sum adder connected from said R— terminal and said first polarity inversion multiplier to produce an output voltage proportional to the mean sum $$-\left(\frac{R + (-x)}{2}\right)$$

a first adder connected from said first polarity inversion multiplier and said first mean sum adder to produce an output voltage proportional to the mean sum $$+\left(\frac{R+x}{2}\right)$$

and a second polarity inversion multiplier connected from said first mean sum adder and said first adder to produce an output voltage proportional to the product $$\left(\frac{R-x}{2}\right)\left(\frac{R+x}{2}\right) = \frac{+y^2}{2}$$

said third means includes a summing circuit and an amplifier connected from said second polarity inversion multiplier to produce an output voltage proportional to $R_1$; and said second means includes a second adder connected from said $R_0$— terminal and said first polarity inversion multiplier to produce an output voltage proportional to the difference $x-R_0=x_1$, a polarity inverter connected from said second adder to produce an output voltage proportional to $-x_1$, a second mean sum adder connected from said second adder and said polarity inverter to produce an output voltage proportional to the mean sum $$-\left(\frac{R_1+(-x_1)}{2}\right)$$

a third adder connected from said polarity inverter and said second mean sum adder to produce an output voltage proportional to the mean sum $$+\left(\frac{R_1+x_1}{2}\right)$$

and a constant polarity multiplier connected from said second mean sum adder and said third adder to said summing circuit to produce an output voltage proportional to the product $$-\left(\frac{R_1-x_1}{2}\right)\cdot\left(\frac{R_1+x_1}{2}\right)=\frac{-y_1^2}{4}$$

whereby said summing circuit and said amplifier may produce the polar distance coordinate $R_1$ in proportion to the magnitude of the difference $$\frac{y^2}{4}-|y_1|^2$$

6. The invention as defined in claim 3, wherein a divider is connected from said second and third means to produce an output voltage proportional to the ratio $$\frac{x_1}{R_1}=\arccos\theta_1$$

and an arccosine function generator is connected from said divider to provide an output voltage proportional to $+|\theta|$ and $-|\theta|$.

7. The invention as defined in claim 6 wherein angle polarity control means are connected from said arccosine function generator to produce an output voltage proportional to $+\theta_1$.

8. The invention as defined in claim 7, wherein said angle polarity control means comprises a polarity inverter connected from said arccosine function generator, a relay having first, second and output contacts, said first contact being connected to said polarity inverter, said second contact being connected to said arccosine function generator, said relay having a movable contact arm pivoted at said output terminal and connected between said output terminal and said first contact of said relay when said relay is not energized, and means connected to said $\theta-$terminal for energizing said relay to produce a voltage at the output terminal of said relay proportional to $+\theta_1$.

9. In a coordinate translation system for producing an output voltage proportional to at least one of the translated polar coordinates $R_1$ and $\theta_1$ of a point with respect to an origin of translation at the intersection of a pair of translated rectangular coordinate axes $x_1$ and $y_1$ in response to input voltages proportional to the polar coordinates R, $\theta$ of the point with respect to an initial origin at the intersection of a pair of initial rectangular coordinate axes $x$, $y$ and an input voltage proportional to the distance $R_0$ between said origins, the combination comprising: first means responsive to only the input voltages for producing a first reference voltage proportional to one of the rectangular coordinates of said point with respect to said translated rectangular coordinate axes, second means responsive only to two of said input voltages and to a voltage proportional to only one of the translated polar coordinates of said point for producing a second reference voltage proportional to said one translated rectangular coordinate, and third means for comparing said first and second reference voltages to produce an output voltage proportional to said one translated polar coordinate, said third means including fourth means to subtract one of said reference voltages from the other and an amplifier responsive to the output of said fourth means for producing said output voltage and impressing it upon said second means, said one translated rectangular coordinate being $y_1$.

10. In a coordinate translation system for producing an output voltage proportional to at least one of the translated polar coordinates $R_1$ and $\theta_1$ of a point with respect to an origin of translation at the intersection of a pair of translated rectangular coordinate axes $x_1$ and $y_1$ in response to input signals proportional to the polar coordinates R, $\theta$ of the point with respect to an initial origin at the intersection of a pair of initial coordinate axes $x$, $y$ and an input voltage proportional to the distance $R_0$ between said origins, the combination comprising: first means responsive to only the input voltages for producing a first reference voltage proportional to one of the rectangular coordinates of said point with respect to said translated rectangular coordinate axes, second means responsive only to two of said input voltages and to only one of the translated polar coordinates of said point for producing a second reference voltage proportional to said one translated rectangular coordinate, and third means for comparing said first and second reference voltages to produce an output voltage proportional to said one translated polar coordinate, said third means including fourth means to subtract one of said reference voltages from the other and an amplifier responsive to the output of said fourth means for producing said output voltage and impressing it upon said second means, said one translated rectangular coordinate being $x_1$.

11. The invention as defined in claim 10, wherein said first means includes a cosine function generator for producing an output voltage proportional to cos $\theta$, a polarity inversion multiplier for producing an output voltage proportional to $-R$ cos $\theta$ and an adder for summing $R_0-R$ cos $\theta=x_1$, and said second means including a sine function generator for producing an output voltage proportional to sine $\theta$, a polarity inversion multiplier for producing an output voltage proportional to $-R$ sin $\theta$, a constant polarity multiplier for producing an output voltage proportional to $-|x_{12}|=R$ sin $\theta$ cot $\theta_1$, and a co-tangent function generator for producing an output voltage proportional to cot $\theta_1$ in proportion to the output voltage amplitude of said third means, said output voltage amplitude of said third means being proportional to $\theta_1$.

12. In a coordinate translation system for producing an output signal proportional to at least one of the translated polar coordinates of a point with respect to an origin of translation at the intersection of a pair of translated rectangular coordinate axes in response to input signals proportional to the polar coordinates of the point with respect to an initial origin at the intersection of a pair of initial coordinate axes and the distance between said origins, one of the coordinate axes in each of said pairs extending through each of said origins and thereby being common, the combination comprising: first means responsive to only the input signals for producing a first reference signal proportional to one of the rectangular coordinates of said point with respect to said translated rectangular coordinate axes, second means responsive only to two of said input signals and to only one of the translated polar coordinates of said point for producing a second reference signal proportional to said one translated rectangular coordinate, and third means for comparing said first and second reference signals to produce an output signal proportional to said one translated polar coordinate.

13. In a coordinate translation system for producing an output voltage proportional to at least one of the translated polar coordinates $R_1$ and $\theta_1$ of a point with respect to an origin of translation at the intersection of a pair of translated rectangular coordinate axes $x_1$ and $y_1$ in response to input signals proportional to the polar coordinates $R$, $\theta$ of the point with respect to an initial origin at the intersection of a pair of initial coordinate axes $x$, $y$ and the distance $R_0$ between said origins, the $x$ and $x_1$ axes in each of said pairs extending through each of said origins and thereby being common, the combination comprising: first means responsive to only the input voltages for producing a first reference voltage proportional to one of the rectangular coordinates of said point with respect to said translated rectangular coordinate axes, second means responsive only to two of said input voltages and to only one of the translated polar coordinates of said point for producing a second reference voltage proportional to said one translated rectangular coordinate, and third means for comparing said first and second reference voltages to produce an output voltage proportional to said one translated polar coordinate.

14. The invention as defined in claim 13, wherein said third means includes fourth means to subtract one of said reference voltages from the other and a high gain amplifier responsive to the output of said fourth means for both producing said output voltage and impressing it upon said second means.

No references cited.

UNITED STATES PATENT OFFICE
CERTIFICATE OF CORRECTION

Patent No. 3,017,105                          January 16, 1962

Alvin Guy Van Alstyne et al.

It is hereby certified that error appears in the above numbered patent requiring correction and that the said Letters Patent should read as corrected below.

Column 1, line 39, for "aircraf's" read -- aircraft's --; column 2, line 48, after "provide" insert -- an --; column 3, line 41, the formula should appear as shown below instead of as in the patent:

$$y = [(R+x)(R-x)]^{1/2}$$

column 5, line 23, for "-x-R" read -- -x=-R --; column 7, line 31, for "-θ1" read -- $-|\theta_1|$ --; column 8, line 18, for "cos" read -- cot --; same line 18, for "cot" read -- cos --; column 10, lines 68 to 69, the formula should appear as shown below instead of as in the patent:

$$\left(\frac{R-x}{2}\right)\left(\frac{R+x}{2}\right) = \frac{+y^2}{4}$$

column 11, lines 28 and 29, the formula should appear as shown below instead of as in the patent:

$$\frac{y'}{4} = \left|\frac{y1^2}{4}\right|$$

Signed and sealed this 3rd day of July 1962.

(SEAL)
Attest:
ERNEST W. SWIDER
Attesting Officer

DAVID L. LADD
Commissioner of Patents